(12) United States Patent
Fitzsimmons et al.

(10) Patent No.: US 12,714,274 B2
(45) Date of Patent: Aug. 25, 2026

(54) LOW PROFILE BUCKET LID AND DUST CYCLONE

(71) Applicant: Oneida Air Systems, Inc., Syracuse, NY (US)

(72) Inventors: John J. Fitzsimmons, Syracuse, NY (US); Robert M. Witter, Englewood, FL (US); Jeffrey Hill, Cicero, NY (US); Joseph Baldwin, Syracuse, NY (US); Alexander M. Lippassaar, Massena, NY (US); David J. Safran, Syracuse, NY (US)

(73) Assignee: ONEIDA AIR SYSTEMS, INC., Syracuse, NY (US)

( * ) Notice: Subject to any disclaimer, the term of this patent is extended or adjusted under 35 U.S.C. 154(b) by 304 days.

(21) Appl. No.: 18/207,377

(22) Filed: Jun. 8, 2023

(65) Prior Publication Data

US 2024/0225391 A1 Jul. 11, 2024

Related U.S. Application Data

(63) Continuation-in-part of application No. 29/869,865, filed on Jan. 11, 2023, now Pat. No. Des. 1,066,840.

(51) Int. Cl.
*A47L 9/16* (2006.01)
*B01D 45/16* (2006.01)
(Continued)

(52) U.S. Cl.
CPC ............. *A47L 9/1608* (2013.01); *A47L 9/165* (2013.01); *A47L 9/1658* (2013.01);
(Continued)

(58) Field of Classification Search
CPC ...... A47L 9/1608; A47L 9/165; A47L 9/1658; A47L 9/1683; A47L 9/1691; B01D 45/16; B04C 3/06; B04C 9/00; B04C 2009/005; B04C 5/185; B65D 43/0204; B65D 43/065; B65D 45/16; B65D 2543/00092; B65D 2543/00555; B65D 2543/0099
See application file for complete search history.

(56) References Cited

U.S. PATENT DOCUMENTS 3,822,533 A * 7/1974 Oranje .................. B01D 45/16
55/394
3,925,044 A * 12/1975 Tu ............................ B04C 5/04
55/459.2

(Continued)

*Primary Examiner* — Dung H Bui
(74) *Attorney, Agent, or Firm* — Barry F. Manna

(57) ABSTRACT

A low-profile dust collector assembly incorporates a low-profile cyclonic separator built-into a lid for a portable dust collection bucket. An outer lid ring can have coffers that add strength to the lid and also reduce swirl in the air below the lid. The cyclonic separator has a shell rising from an inner circumference of the lid ring and has a horizontal inlet tube and central vertical outlet tube. A baffle for the separator includes a baffle plate fitted within the inner circumference and a turret of vertical members arranged with a top ring that fits onto the outlet tube. This compact arrangement has improved performance in airflow and dust separation. A spring clamp assists in fitting onto buckets over a range of diameters, and a pair of circumferential gaskets at right angles to one another form an air-tight seal.

15 Claims, 9 Drawing Sheets

(51) Int. Cl.

| | |
|---|---|
| ***B04C 3/06*** | (2006.01) |
| ***B04C 9/00*** | (2006.01) |
| ***B65D 43/02*** | (2006.01) |
| ***B65D 43/06*** | (2006.01) |
| ***B65D 45/16*** | (2006.01) |

(52) U.S. Cl.

CPC ........... *A47L 9/1683* (2013.01); *A47L 9/1691* (2013.01); *B01D 45/16* (2013.01); *B04C 3/06* (2013.01); *B04C 9/00* (2013.01); *B65D 43/0204* (2013.01); *B65D 43/065* (2013.01); *B65D 45/16* (2013.01); *B04C 2009/005* (2013.01); *B65D 2543/00092* (2013.01); *B65D 2543/00555* (2013.01); *B65D 2543/0099* (2013.01)

(56) References Cited

U.S. PATENT DOCUMENTS

| | | | | | |
|---|---|---|---|---|---|
| 4,406,677 | A * | 9/1983 | Obermeier | B04C 7/00 | 55/459.3 |
| 4,819,417 | A * | 4/1989 | Bryant | A01D 43/077 | 56/16.6 |
| 5,236,479 | A * | 8/1993 | Billingsley | B01D 50/20 | 55/459.2 |
| 5,525,396 | A * | 6/1996 | Rudolph | A47L 9/1658 | 55/342 |
| 5,904,755 | A * | 5/1999 | Kanazashi | F24F 9/00 | 96/61 |
| 6,027,541 | A * | 2/2000 | Siemers | B01D 45/16 | 55/435 |
| 6,210,457 | B1 * | 4/2001 | Siemers | B01D 45/16 | 55/435 |
| 6,471,751 | B1 * | 10/2002 | Semanderes | B01D 46/76 | 95/271 |
| 6,767,380 | B2 * | 7/2004 | Von, Jr. | B01D 45/08 | 96/406 |
| D495,347 | S * | 8/2004 | Erbach | D15/138 | |
| 7,282,074 | B1 | 10/2007 | Witter | | |
| 10,857,550 | B2 | 12/2020 | Huntley | | |
| D933,321 | S | 10/2021 | Fitzsimmons et al. | | |
| 11,358,156 | B1 * | 6/2022 | Tucker | B04C 5/13 | |
| 11,419,467 | B2 | 8/2022 | Fitzsimmons et al. | | |
| 11,690,331 | B2 * | 7/2023 | Lauer | A01D 43/0636 | 15/345 |
| 11,910,989 | B2 * | 2/2024 | Knight | A47L 9/16 | |
| 2004/0154126 | A1 * | 8/2004 | Hansen | B04C 5/185 | 15/353 |
| 2006/0037172 | A1 * | 2/2006 | Choi | A47L 9/1683 | 15/352 |
| 2006/0277714 | A1 * | 12/2006 | Dunning | B02C 18/14 | 15/340.2 |
| 2007/0079582 | A1 * | 4/2007 | Oh | A47L 9/165 | 55/345 |
| 2007/0199284 | A1 * | 8/2007 | Yoo | B01D 45/12 | 55/345 |
| 2009/0133370 | A1 * | 5/2009 | Yoo | A47L 9/165 | 55/455 |
| 2010/0132317 | A1 * | 6/2010 | Thien | B01D 45/08 | 55/368 |
| 2010/0218466 | A1 * | 9/2010 | Lloyd | B01D 50/20 | 55/385.3 |
| 2012/0055125 | A1 * | 3/2012 | Manska | B04C 5/103 | 55/394 |
| 2018/0369849 | A1 * | 12/2018 | Loos | B05B 14/45 | |

* cited by examiner 12
24
28
40
34
32
34
20
36
36
30
34
63
44
42
46
48
46
50

140
30
12
22
140

140
22
12
140
30
10

LOW PROFILE BUCKET LID AND DUST CYCLONE

This application is a Continuation-in-Part of our Design patent application Ser. No. 29/869,865, filed Jan. 11, 2023, the disclosure of which is incorporated herein by reference.

BACKGROUND AND FIELD OF THE INVENTION

The present invention relates to the technical field of dust collectors which are aerodynamic devices that separate particulate material out of a flow of dust-laden air. The invention is more particularly concerned with a low-profile separator having a separation chamber which induces a spiral or cyclonic flow that separates particles so that they fall into the dust collector bucket, and send the remaining dust-free air flow out from an outlet tube, so it can be filtered and returned to the ambient air. The dust collection is designed to achieve a low-profile appearance, i.e., having a separator body that is shorter vertically than it is wide horizontally.

The invention is also directed to dust collectors of the type generally used in wood shops or similar applications, in which a vacuum source is connected to the outlet tube of a cyclonic dust separator structure to induce a spiral flow of production exhaust air coming from a source of dust-laden air, such as a saw, router, power sander, or the like. The air flow with entrained process dust flows through an inlet to the cyclonic dust separator structure, and then passes, with particulate dust removed, via an outlet tube and a final filter, to the ambient air in the room.

In many small-shop applications, the dust collection system can include an auxiliary dust collector cyclone that is placed in line between the source of dust-laden air and a vacuum machine such as a shop vacuum or dust extractor. An example of such an auxiliary dust collector cyclone is described in U.S. Pat. No. 7,282,074, and is known in the trade by its familiar trademark, Dust Deputy. This cyclone unit comprises a small molded V-shaped cyclone that is typically mounted onto the lid of a standard bucket. A ring flange on the nose of the cyclone is bolted onto the lid of that bucket. The cyclone is typically molded of a tough plastic resin, but in some applications a steel cyclone is used. The dust collection bucket can typically be a five-gallon plastic pail which employs a lid that is formed of a circular disk with an annular channel at its rim that fits onto a flat annular rim at the top of the bucket or pail. The open nose of the cone (with its annular ring flange bolted onto the circular disk of the lid) faces a central hole or opening in the lid. In this case the circular opening in the lid and the ring of bolt holes can be punched or drilled into the lid. The lid can typically snap-fit onto the bucket or barrel, although in some cases machine screws or other fasteners may be used to secure the rim of the lid to the rim of the bucket. A seal or gasket can prevent air leakage between the bucket and the lid. A round gasket is commonly used between the ring flange of the cyclone and the center part of the lid. The lid and cyclone of this invention may be fastened onto a cover for a large fiber or steel barrel, which may be provided with a suitable center opening, and where it is needed or desirable to collect a larger amount of particulate matter.

In operation, a vacuum hose leads from the outlet tube of the cyclone to the shop vacuum or dust extractor. This creates negative operating pressure that can flex the material of the lid downwards, sometimes allowing leakage of air and instability of the bucket-lid-cyclone structure. In some applications, because of the height of the rather tall V-shaped cyclone, the negative pressure in the hose between the cyclone and the vacuum source can pull strongly on the top of the cyclone, and when unsupported, can cause the bucket-lid-cyclone to lean and occasionally tip over.

Recently, a bucket lid for this type of cyclonic dust collector was proposed. The bucket lid is molded or formed with coffers of baffles that slope downward into the bucket. These baffles incorporate radial reinforcing ribs alternating with ramped coffers. These serve to reinforce the lid and more steadily support the cyclone when the system is in use. These baffles also serve to interfere with any swirl of air below the lid, and prevent re-introduction of the separated dust into the airstream. An example of this type of bucket lid is shown and described in U.S. Pat. No. 11,419,467, granted Aug. 23, 2022, and US Des 933,321, granted Oct. 12, 2021.

In many small wood shops and other workshops, the amount of vertical space available for the dust separation and collection equipment is limited. This makes it difficult to accommodate a tall unit with a V-shaped cone such as described above. In such a case, a low-profile separator may be needed, and at the same time a separator with high separation efficiency and minimal air pressure drop may also be needed.

Another previously proposed low-profile dust collector was designed to fit onto the same standard five-gallon bucket; this dust collector is described in Huntley U.S. Pat. No. 10,857,550, granted Dec. 8, 2020. That design is considered adequate in some applications for separating dust, but is not as efficient as other dust collectors and tends to exhibit a higher pressure drop across the dust collector portion of the airstream and a higher impedance to air flow.

OBJECTS AND SUMMARY OF THE INVENTION

Accordingly there is a need for a bucket mounted dust separator of a much lower profile than the type with the V-shaped cyclone as described above, but which creates a cyclonic flow that has a high efficiency of dust separation and maintains a very low loss of vacuum through the dust separator.

Further, there remains a need to secure the lid of the system onto the bucket so that the lid is held down snugly and minimizes or eliminates any air leakage between the bucket and the lid.

It is of course an object to reduce or eliminate swirl or other turbulence in the air within the bucket below the lid, so that re-introduction of the collected dust into the air flow is minimized or eliminated.

It is a further object to incorporate the cyclonic dust collector directly into the center portion of the lid, so that the entire lid, bucket, and cyclone structure creates a low profile and can fit more easily into vertically limited spaces.

It is also an object to create the dust-collector-and-lid combination which facilitates assembly of the system for the end user, and also makes the entire system more robust and stable.

Various possible embodiments of this invention may be considered as comprising a lid and a cyclonic separator that is formed into the center part of the lid.

In many practical embodiments, the lid rim portion is designed and configured to fit onto the standard utility bucket, which is the repository for the collected and separated dust from the air stream that carries the process dust. The rim of the lid fits onto the rim of the bucket (or drum) that it sits upon. The rim is considered to be the outer circumference of the lid. The position of the cyclonic separator is at a smaller, interior or inner circumference, and the shell of the separator rises from that interior circumference. The portion of the lid between the interior and outer circumferences is considered to be an outer ring of the rim. In favorable embodiments the outer ring is formed of coffers between interior and outer circumferences. The coffers are each formed of an annular segment with a sloping top surface, with the slope direction being upward in the direction of air flow. A radial bar or vertical wall joins the high end of each annular segment with the lower end of the next.

These radial bars, or walls or steps, serve to block induced air movement, i.e., swirl, within the bucket below the bucket-mounted separator. This swirl may otherwise agitate dust that has settled in the bucket and cause the dust to re-enter the air stream. That is, the object of coffers and verticals is to interrupt air motion in the air flow direction beneath the lid and quiet any air movement in the bucket. The geometry of this lid rim ring also provides additional stiffness to the lid.

Favorably, there are flexible snap-on clamps that secure the lid to the bucket. This helps minimize or prevent air flow into or out from the bucket at the rim of lid. These clamps are preferably adjustable to allow the lid to be easily installed and removed from the bucket. At the same time, an improved seal on the lid ring is configured to prevent air leaking into the bucket during operation. Alternatively screw fittings on the rim of the lid can accept sheet metal screws around the rim for a more permanent connection, if desired. These screw fittings may also be used for accepting screws to fasten the lid-separator onto the larger diameter lid or cover for a full-size dust collection barrel, as mentioned earlier.

Cyclonic Separator Construction

An inlet tube (preferably, horizontally oriented) receives an air flow containing entrained process dust via a hose or similar conduit. Favorably, the inlet tube's female socket fitting receives a male fitting on the hose. The outer shell of the separator rises from the inner circumference of the rim ring and receives the air flow from the inlet tube that is connected to it. The shell upper wall descends as it spirals around its center axis, and a vertical outlet tube is located at that center axis. The illustrated unit here has a left-hand (LH) spiral chamber which defines cyclonic air flow, here in the counter clockwise (CCW) direction. The design for the spiral orientation could be reversed if desired.

The outlet tube serves as a central vertical vortex tube and serves also as a female fitting, which accepts a male hose connector for the hose going to a shop vacuum, dust extractor or similar suction source.

Within the shell there is an internal baffle comprising a baffle plate and a vane turret. The baffle plate serves as a floor for the shell. This fits within the inner circumference of the lid, and is attached to the lid ring for a minor part of its circumference, but is spaced from it for a majority of the spiraling circular air flow path. This results in a circumferential dust slot going about 270 degrees of the inner circumference, i.e., as an annular space at the inside of the rim ring for the separated dust to fall through, which permits dust to pass down into the bucket. This slot increases in width in the direction of air flow, and there is a large opening at the end, for debris and larger particles so they do not clog the slot. At the center of the baffle plate is the vane turret. This is configured as an open-core vertical turret extending from the baffle plate up to the outlet tube, with a turret ring fitting into the lower end of the outlet tube. Favorably the turret is composed of a circular array of vertical vanes or blades rising from the baffle plate, and evenly disposed in a circle at an opening in the baffle plate. The vanes are arranged and spaced evenly apart so that air near the center axis enters through the gaps between successive vanes. Favorably, these are arranged so that the gaps present openings for the air flow, but open in the direction opposite to the air flow direction. Accordingly, the air flow exiting the spiral flow into the interior of the turret makes a sharp bend at this point. This sharp turn in the airflow causes any remaining dust at that point to be accelerated radially and out to the spiral airflow, so the dust can descend through the annular slot and fall into the bucket or drum. At the base of the turret, i.e., at the opening in the baffle plate, there is a domed insert with a center opening. At the base of the vane turret, there is an opening that is formed in the baffle plate. Here, the baffle plate is fitted with a baffle dome that protrudes upwards into the turret, with an opening at its top that permits air to vent quietly out of the dust collection zone below the dust collector, and maintains a balance of air pressure. This minimizes the amount of collected dust that reenters the air flow.

In favorable embodiments, the shell may be made of a transparent plastic resin which makes visible the baffle elements within the shell. This also makes visible the pattern in separated dust flowing within the chamber of the dust separator. In this manner, the unit displays how the spiraling dust travels along the transparent radially-outer wall of the shell. Additionally, the baffle elements, i.e., the baffle plate and the turret, may be made of a brightly colored plastic resin, e.g., a bright blue, so that they are also visible through the transparent shell.

Favorably, an optional sensor (not shown) on the lid detects the level of the collected dust, and signals the operator when the level has become too high, indicating that the bucket is full and needs to be emptied.

These and other features and advantages of the present invention will become apparent from the following detailed description, when considered in connection with the accompanying Drawing Figures.

BRIEF DESCRIPTION OF THE DRAWING FIGURES

For embodiments where the separator shell is made of an opaque material, the construction would be identical or similar, and is not separately shown or described.

DETAILED DESCRIPTION OF PREFERRED EMBODIMENT(S)

Figure 1:
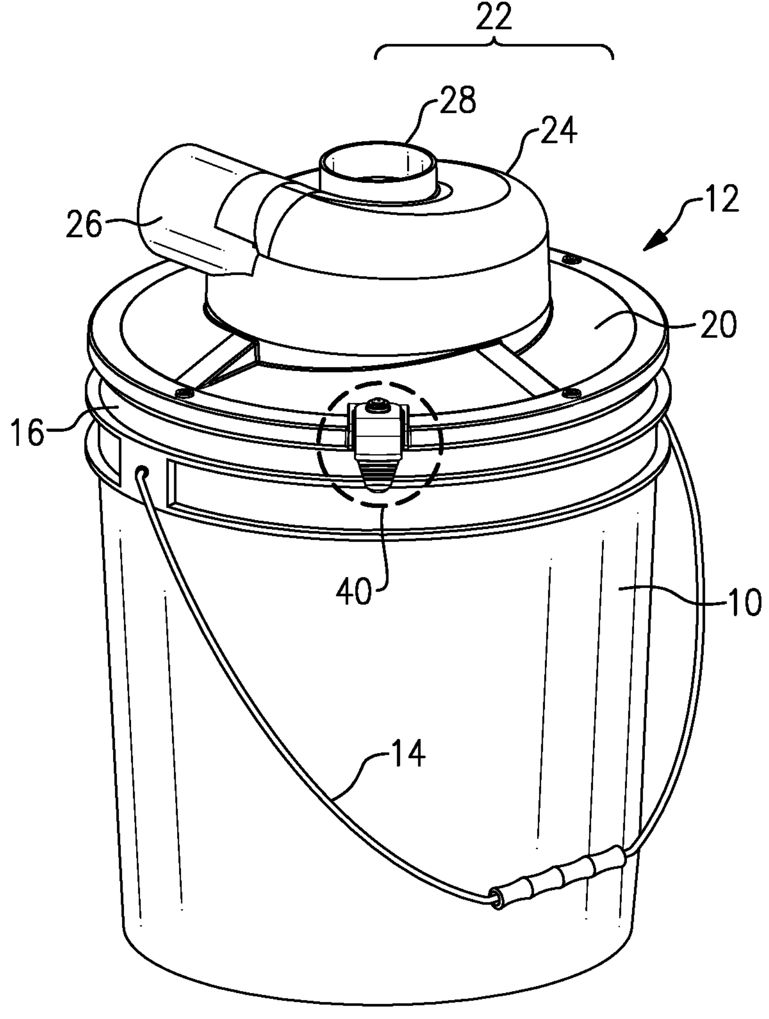
FIG. 1 is a perspective view of the low-profile cyclonic separator and lid, here seated upon a standard five-gallon pail or bucket, according to an embodiment of our invention.

With reference to the Drawing Figures, and initially to FIG. 1, a low profile cyclonic dust separator arrangement is with a standard five-gallon bucket 10, on which the combination lid-and-cyclonic-separator 12 is seated. The arrangement receives a flow of dust laden air from a tool or other dust producing device (not shown), and separates out the dust from the air flow and deposits the dust into the bucket 10 below.

The bucket is shown here as a standard-size 5-gallon utility pail, frequently used to hold drywall compound or other materials, and often sold empty as a utility pail. Here the bucket 10 has a bail handle 14 and a top rim 16 that is designed to mate with the rim of an associated lid.

In this embodiment, the combination lid-and-cyclonic-separator 12 is constructed with a lid ring 20 at its radially outer regions and a separator module 22 at a center portion of thereof.

The separator module 22 rises from a radially inner edge or circumference of the lid ring 20, and is formed of an outer shell 24 of a generally coiled or spiral shape. A generally horizontal inlet tube 26 is joined to an upper end of the shell 24, and a generally vertical outlet tube 28 is disposed at a center axis of the module 22. Here, the inlet tube serves as a female fitting to which the male end of a hose is inserted, to supply the dust-laden air which travels in a spiral path within the shell and exits via the central vertical outlet tube 28 as air from which the large majority of dust has been removed. The outlet tube 28 serves as a female fitting to which is fitted a vacuum hose (not shown) leading to a not-shown dust extractor or shop vacuum.

Figure 2:
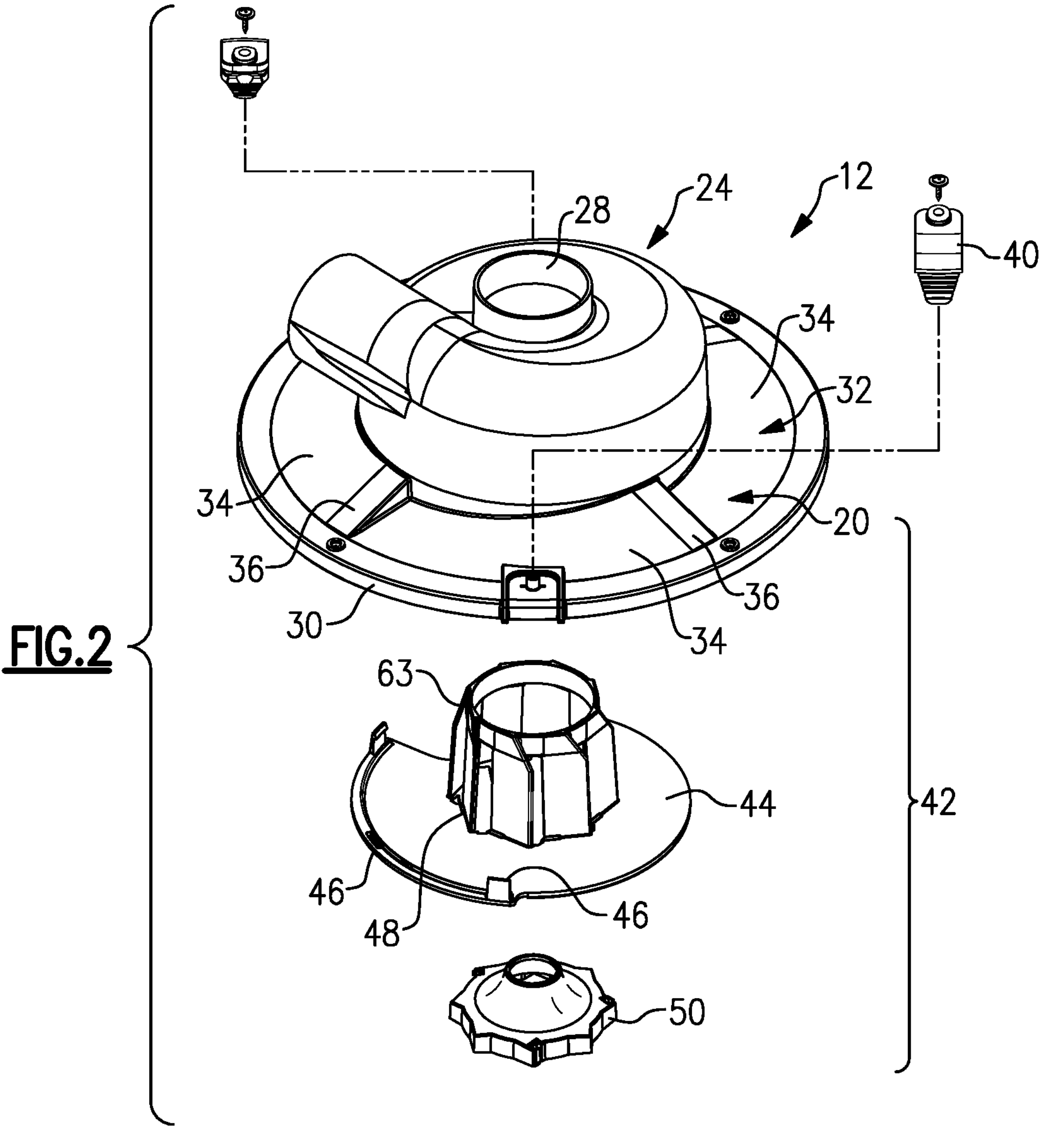
FIG. 2 is an assembly view showing the combined lid and separator shell, the combined baffle plate and vane turret, the baffle domed insert, and a pair of flexible clamps mounted on the rim of the lid.

Now, with further reference to FIG. 2, the lid ring 20 of this embodiment has a rim 30 at its outer circumference adapted to fit onto the top rim 16 of the bucket 10. Radially inside the rim 30 there is an annular series of coffers 32. Each coffer is formed of an arcuate segment 34 that slopes upward along the curve of the rim ring. End walls or steps 36 each join the upper end of each arcuate segment 34 with the lower end of the next. Favorably, this is in the general direction of air flow in the unit, so that the geometry of the series of coffers 32 blocks any swirl of the air beneath the lid ring and prevents any unwanted air movement from forming. The coffers with the sloping segments and vertical steps 36 also serves to reinforce the rim ring 30 to help support the separator module 22 when the unit is in use.

At two or more locations along the rim 30 are located flexible plastic clamps 40 that serve to hold the rim 30 removably against the top rim 16 of the pail or bucket. At the same time there are drilled holes at locations along the rim 30 so that screws may be used to fasten the rim 30 to the top rim of the bucket, if a more permanent fitting is desired.

Shown below the lid ring and shell in this assembly view is a baffle assembly that is positioned at the radial axis of the separator module 22 inside the shell 24. At its base, the assembly includes a baffle plate 44 configured to fit within the inner rim or inner circumference of the lid ring 20. A portion 46 of the baffle plate 44 is curved to match the curvature of the inner circumference and may have prongs or teeth 46 as shown to fit into the rim ring 30 or into the base of the separator shell 24. The remainder of the edge of the baffle plate is set in from the inner circumference so as to define a narrow circumferential slot or space. As shown in FIG. 2, there is a circular array of vanes, i.e., a vane turret 48, rising from the center portion of the baffle plate 44 and extending upwards to a vane turret ring 62, which interfits the outlet tube 28. The portion of the baffle plate inside the turret is open, and this opening is fitted with a baffle plug or insert 50. The plug closes off the base of the baffle assembly, at the base of the vane turret 48, except for a small vent hole that serves to equalize the air pressure between the inside of the turret 48 and the dust repository in the bucket below the lid and cyclonic separator 12, so that the air around the collected dust remains quiet.

Figure 3:
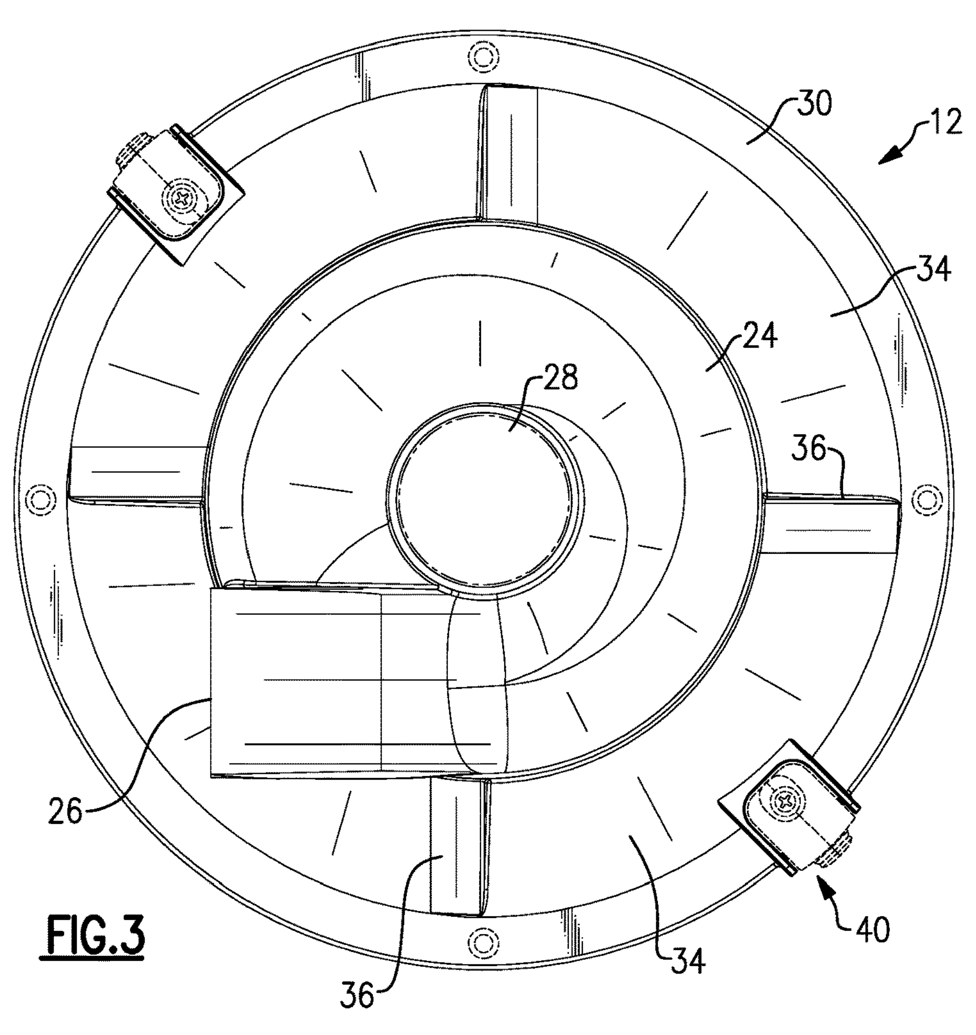
FIG. 3 is a top plan view of the low-profile separator and lid.
Figure 4:
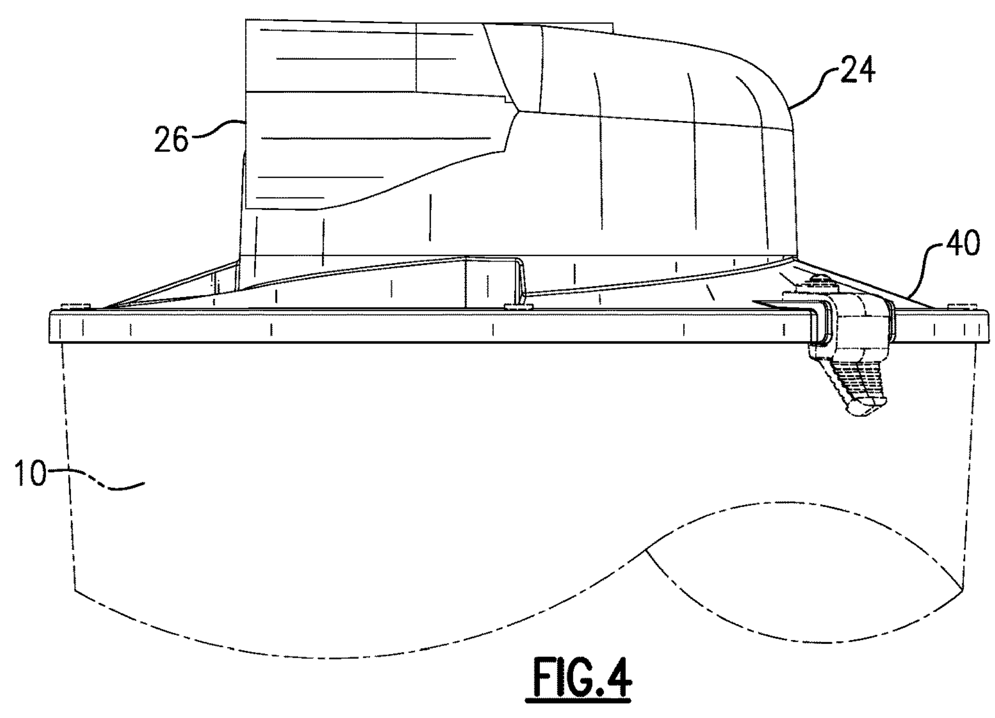
FIG. 4 is a side elevation thereof.

FIGS. 3 and 4 show this embodiment in a top plan view and a right side elevation. In this embodiment the entering air stream goes through the inlet tube 26 into the shell 24 so that the air flow direction within the shell 24 is in a counter-clockwise (CCW) direction and then circles in a radially inward direction to exit through the outlet tube 28. Also shown here, the two flexible rubber clamps 50 are disposed opposite one another, i.e., 180 degrees apart. More clamps could be used if desired. FIG. 4 shows the upward angle of the coffers 32, that is, upward in the direction of air flow.

Figure 5:
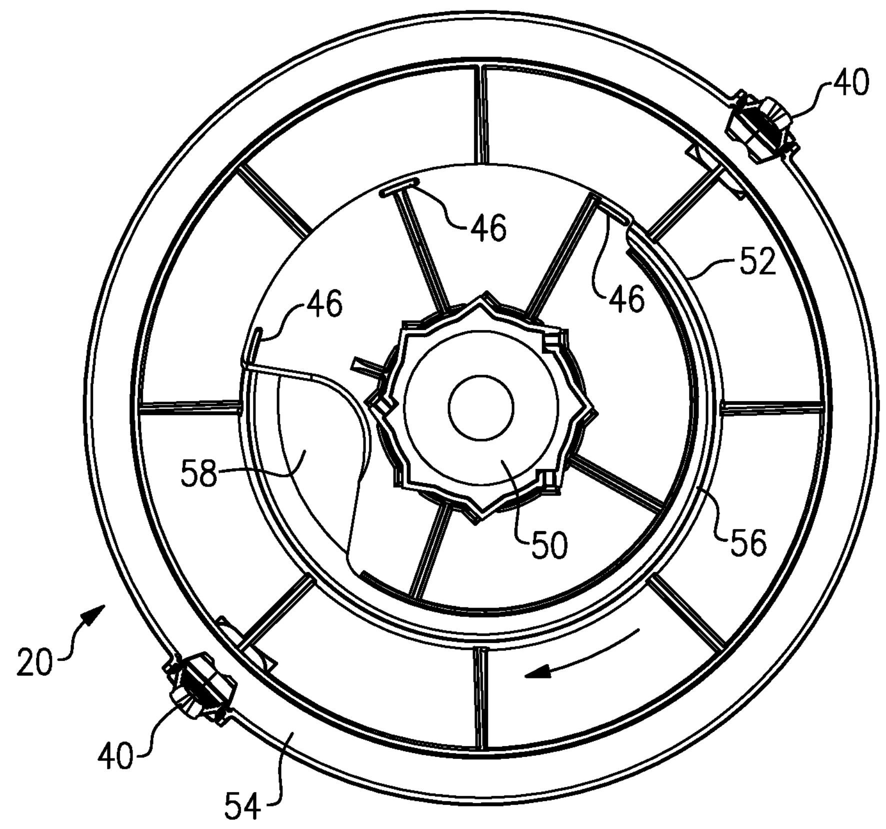
FIG. 5 is a bottom plan view of the low-profile separator and lid.

FIG. 5 shows a bottom plan view of the combination lid-and-cyclonic-separator 12. There is a space or circumferential slot 56 proceeding over a majority of the circumference of the baffle plate 44. The slot proceeds in the airflow direction (which is counter clockwise looking down as in the previous views, but thus clockwise in this view looking upwards). The slot 56 gradually increases in gap width until it reaches a wide opening 58. This configuration prevents chunks from becoming jammed in the slot and blocking dust flow. Larger particles continue around until they drop through. Chunks can easily pass through the wide gap 58 at the end.

The circumferential rim channel 54 is shown at the outer perimeter of the lid ring 30. This channel 54 may have a foam gasket to help seal against air leakage between the rim channel 54 and the bucket top rim 16.

As this view is upwards from below, whereas the air flow direction is counter-clockwise (CCW) when viewed from above in FIG. 3, and the airflow is CCW above the baffle plate, the airflow direction is clockwise (CW) on the opposite side of the baffle plate as in the view of FIG. 5. Thus this view illustrates the increase in slot width of slot 56, in the airflow direction. The very wide space 58 is shown at the end of the slot 56, in the airflow direction. The geometry of the circumferential slot 56 allows dust that separates from the air stream to fall through the slot, and any solid chunks and debris continue around and fall through the slot or though the wide opening 58, not clogging or jamming the slot.

This view also illustrates the arcuate segments 34 that constitute the coffers of the lid ring.

Figure 6:
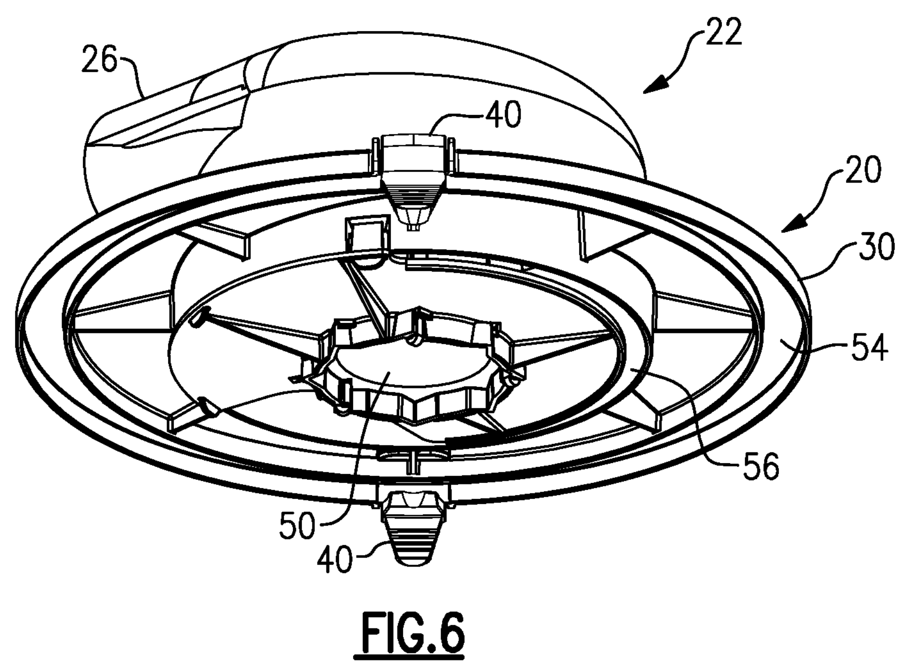
FIG. 6 is a perspective view from below featuring the bottom side of the lid ring and the baffle.
Figure 7:
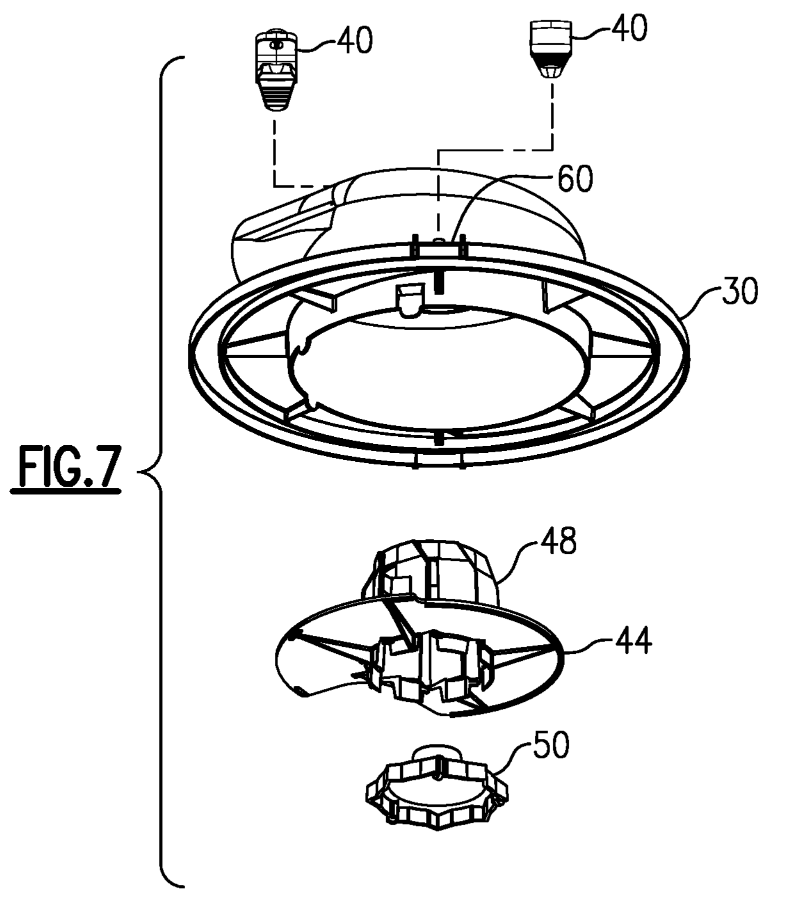
FIG. 7 is an assembly view from below featuring the combined lid ring and separator shell, the combined baffle plate and vane turret, and the baffle insert.

The perspective view of FIG. 6 and the exploded or assembly perspective of FIG. 7 further illustrate the various components discussed in the previous several paragraphs with some details of their shape and how they interfit with other components. In this embodiment, for each of the flexible rubber clamps 40 there is a receptacle 60 molded into the outer edge of the lid ring.

FIG. 7 also shows latch receptacles 60 formed or molded onto the rim 30 for locating and assisting the snap action of the associated flexible latches 40.

Figure 8:
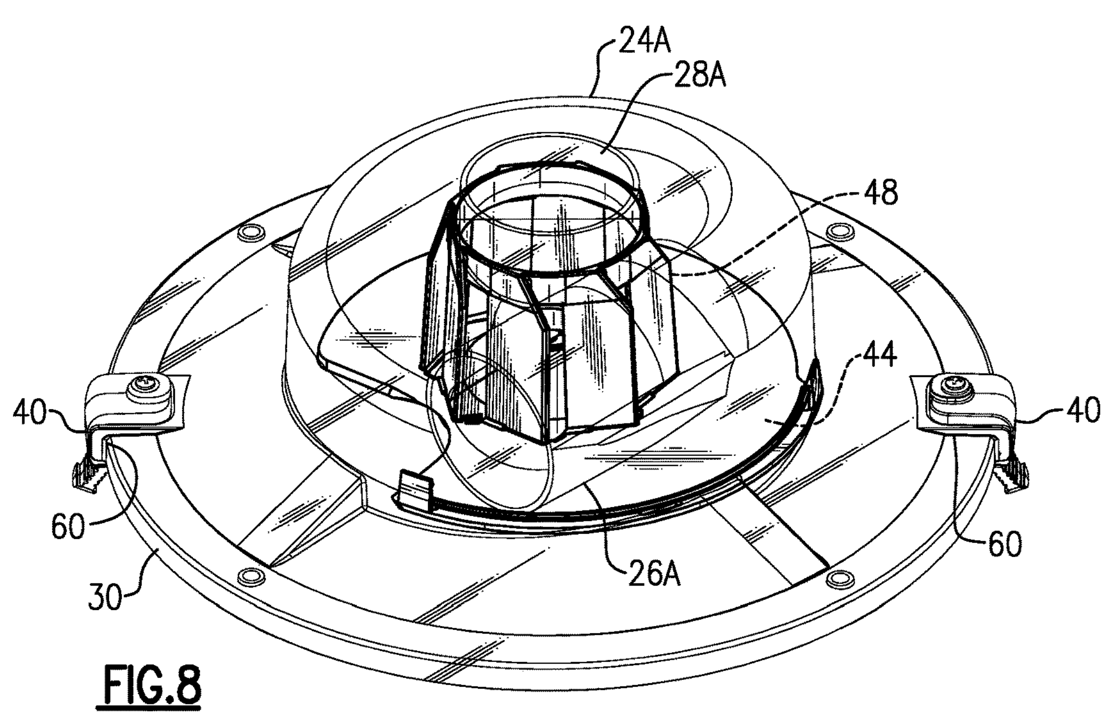
FIG. 8 is a perspective view of the low profile separator and lid, with the baffle elements visible through the separator shell which here is formed of a transparent plastic resin material.
Figure 9:
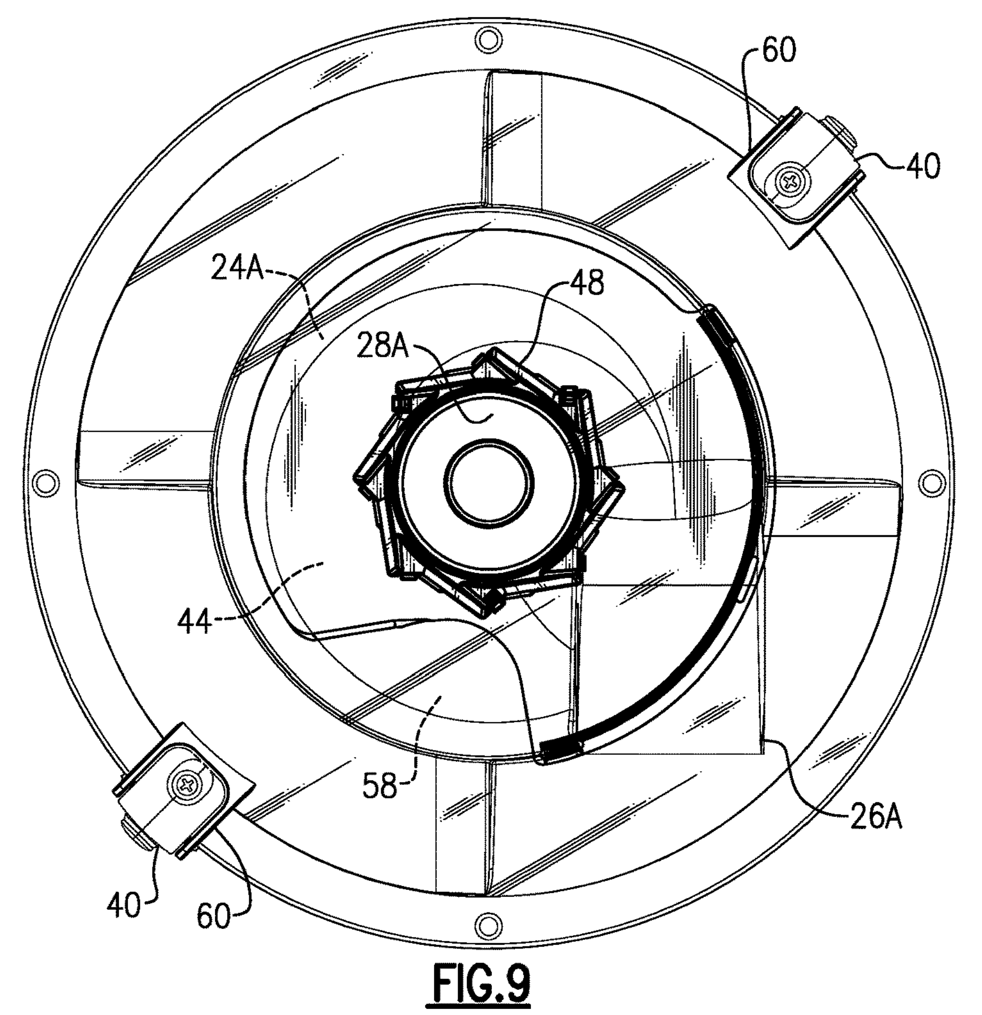
FIG. 9 is a top plan view of the low-profile separator and lid of FIG. 8.

FIGS. 8 and 9 are a perspective view and a plan view of a related embodiment, which has the same constituents as the first-described embodiment, except that the shell 24A, including inlet tube 26A and outlet tube 28A are formed of a transparent material, so that interior components such as the baffle plate 44 and vane turret 48 are visible through the shell of the dust separator. In operation, the separated dust that cycles around the interior of the shell will also be visible. Thus any blockage or other irregularity in the flow of air and dust through the shell will be noticeable, and can be addressed.

In these views, the vane turret 48 is shown as having eight vanes each extending vertically from the baffle plate and configured such that there is a spacing between successive vanes, and an opening at the outer end of the vanes to permit air flow from the outer portion of the shell, through the vanes into the core of the turret, and out through the outlet tube. The CCW air flow within the separator module 22 has to change directions and make a sharp bend when it enters the spaces between the vanes. This sharp change of airflow direction accelerates any entrained particulate at this point so that the particulate solids are flung out towards the circumferential dust slot 56, optimizing their separation.

The number of vanes depends on the size and geometry of the separator module, and a practical vane turret may instead have seven vanes, arranged in a cylindrical fashion, but with the outer edges of the vanes placed against the flow direction, so that the airflow makes a sharp turn when entering into vane turret.

The vane turret dome 50, i.e., plug or insert is fitted into the bottom end of the vane turret 48. In this embodiment the dome base has a shape of an eight-pointed star that matches the arrangement of vanes at the foot of the turret. The vane ring 62 is fused to the upper end of the vanes in the turret, and ensures that the separated air flows out from the core of the turret and up through the outlet tube 28. Of course, if the shell is formed of an opaque material, the inner components, i.e., the baffle plate and turret, as well as the spiraling separated dust, would not be visible.

Figures 10, 11:
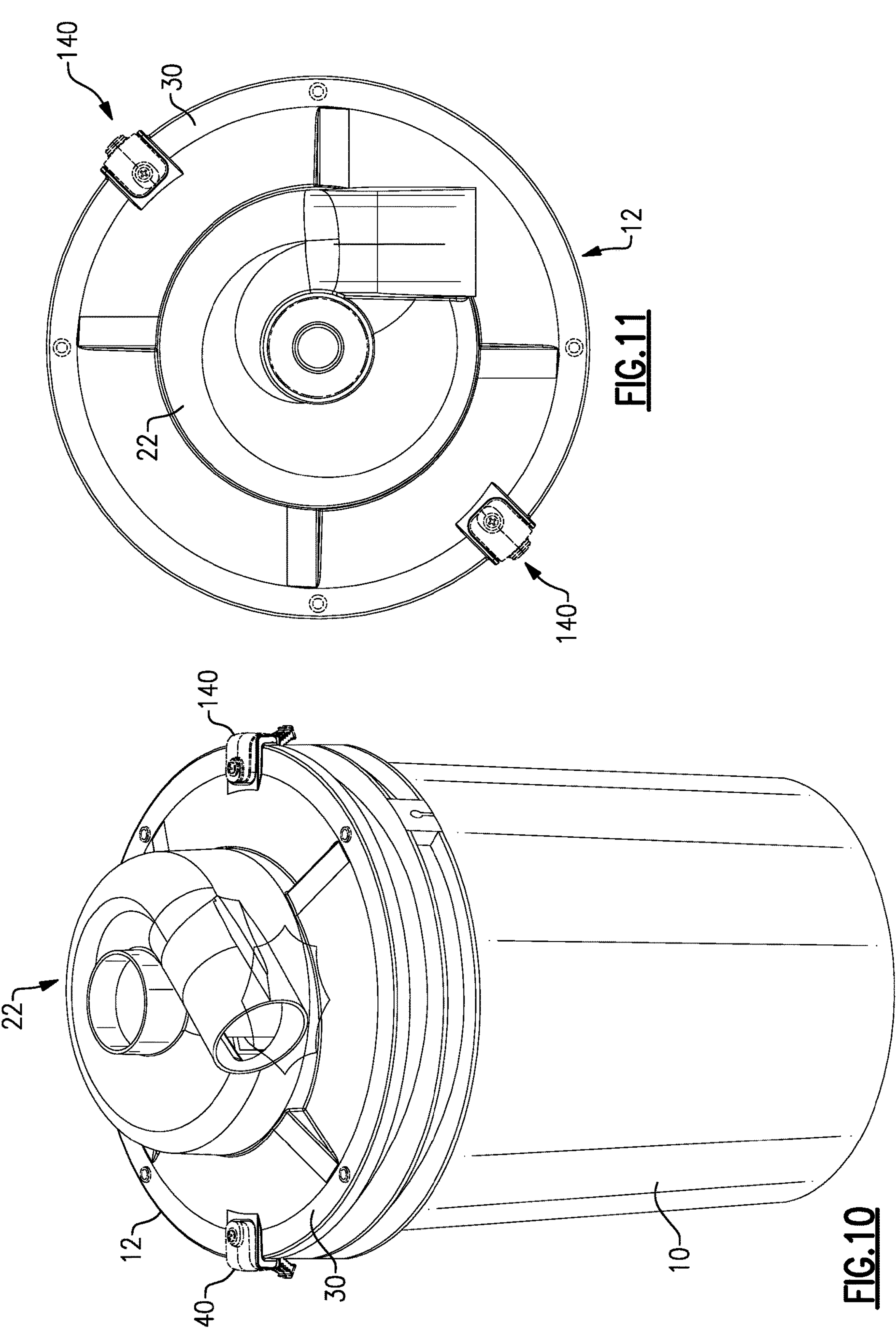
FIG. 10 is a perspective view of the bucket and lid-separator, showing also the improved spring clamps or latches.
FIG. 11 is a top plan view thereof.

Now, as shown in FIG. 10 and the ensuing drawing FIGS. 11 to 15, a spring clamp 140 is shown to be employed on the lid rim 30 rather than the all-plastic latch or clamp 40 described earlier. This clamp 140 provides a secure, but adjustable attachment to the top rim of the bucket or pail 10. Preferably there are a pair of these spring latches 140 disposed on opposite sides of the cyclonic separator 22, as seen in FIG. 11, and these may be positioned at the two receptacles 60 described earlier (see FIG. 7).

Figures 12, 13, 14:
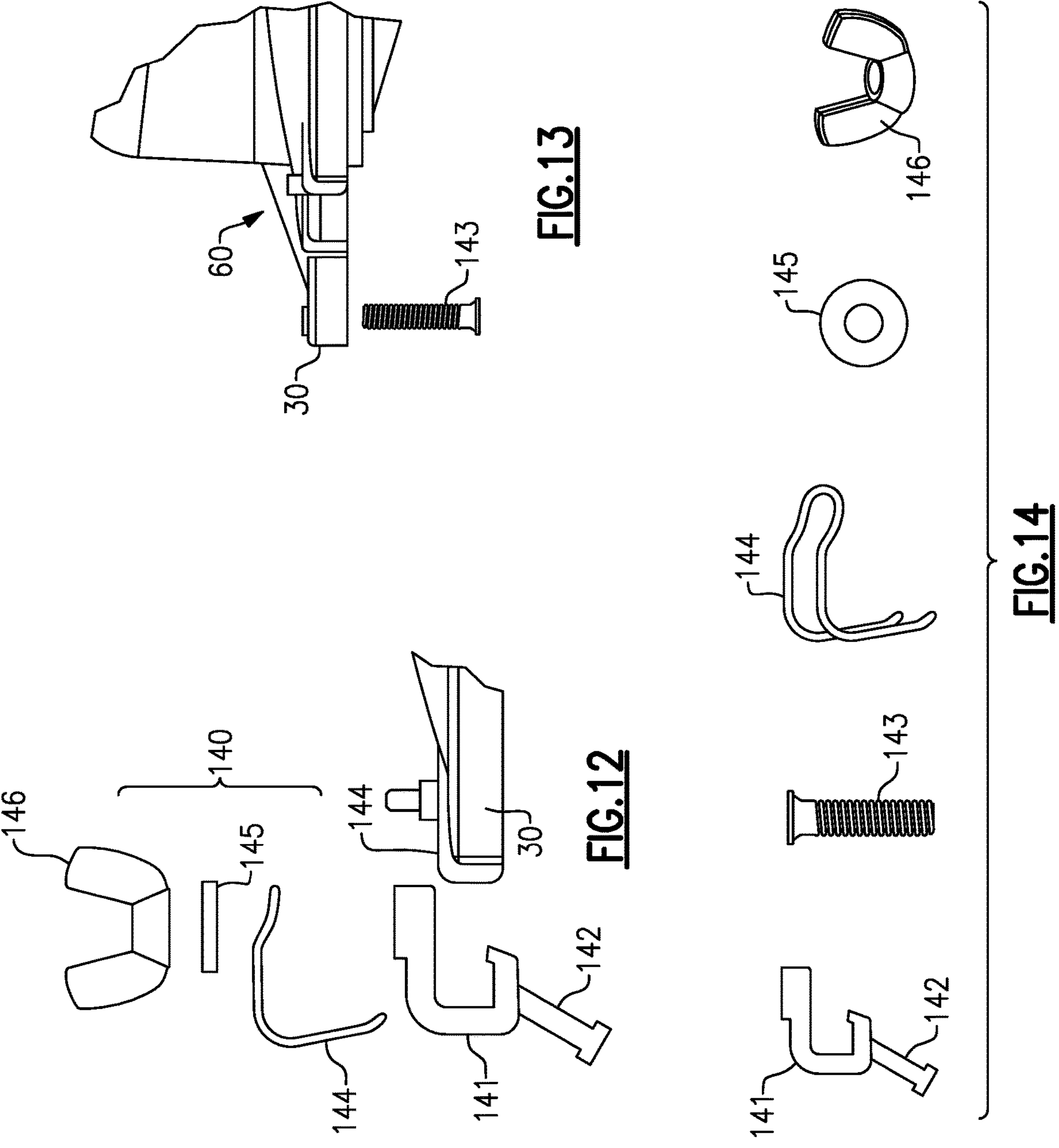
FIG. 12 is an exploded elevation showing the components and placement thereof for the improved clamp or latch.
FIG. 13 is an elevation showing the pem stud component relative to the associated rim ring and the receptacle for the clamp or latch.
FIG. 14 is an assortment view of the components of the clamp or latch.
Figures 15, 16, 17, 18, 19:
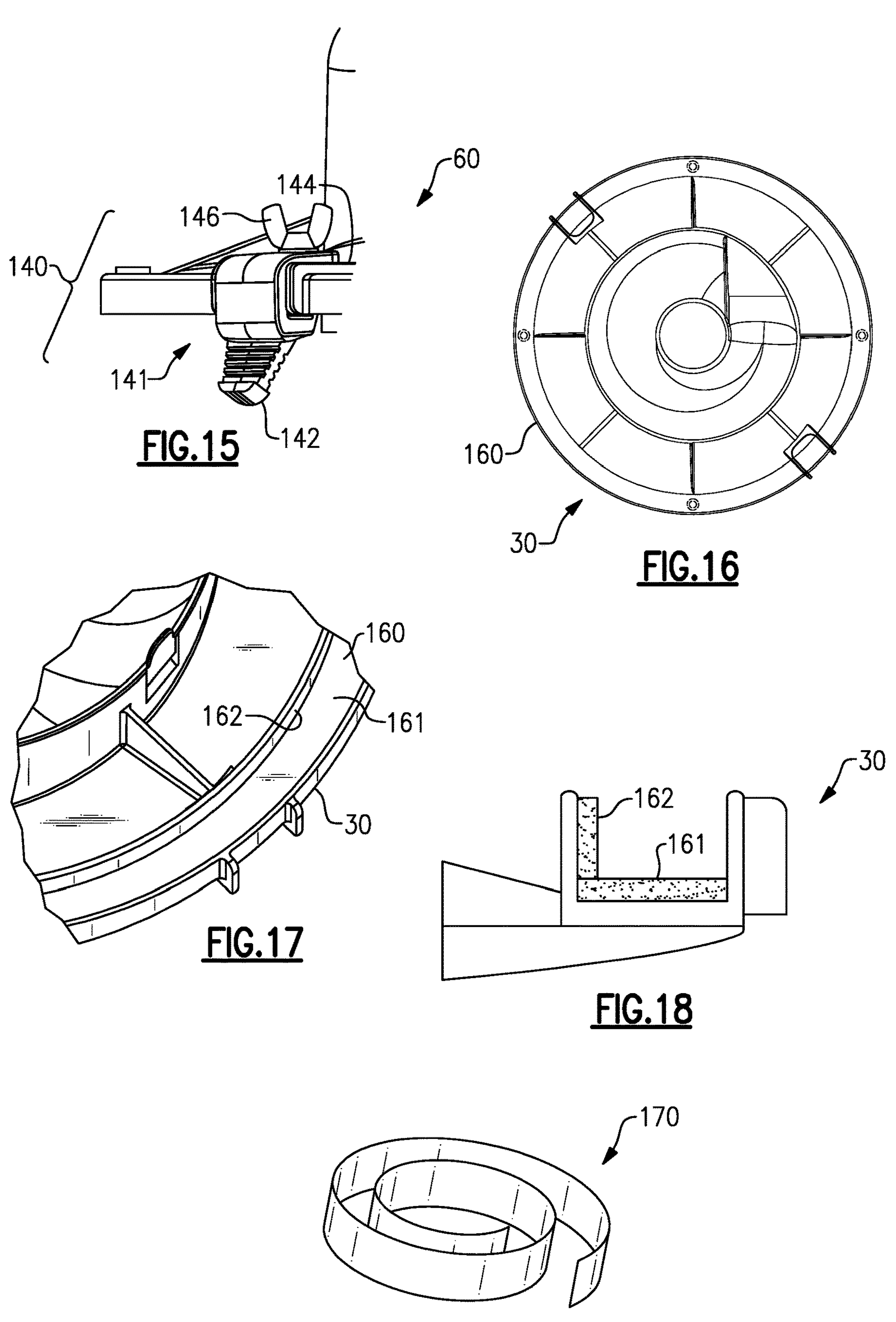
FIG. 15 is a partial perspective view featuring the improved clamp as installed on the rim ring.
FIG. 16 is a bottom plan of the lid and cyclonic separator of this invention featuring the improved seal.
FIG. 17 is a partial bottom perspective view thereof.
FIG. 18 is a partial cross-section thereof.
FIG. 19 shows a supply of conductive tape for forming an anti-static arrangement on the low-profile cyclonic separator and lid.

The set of components of the spring clamp or latch 140 are illustrated in FIGS. 12 and 14. A generally C-shaped flexible plastic latch member 141 is shown there, which included a finger grip or pull handle 142 affixed onto its lower limb. A pem stud 143 is used to secure the latch member 141 onto the lid rim 130 (see FIGS. 12 and 13), as well as to hold down the remaining components. A pem stud is a self-clinching stud, i.e., male threaded rod with a head, where the rod side of the head is configured so that the action of an associated nut squeezed the head into the plastic material of the rim ring until the pem stud head is flush (with the underside of the rim ring). A spring clip 144 fits over the plastic latch member 141 and these are secured in place (on the receptacle 60), by a washer 145 and wing nut 146 onto the pem stud 143 (FIG. 15). Once this spring clamp 140 is installed, it can be adjusted by loosening the wing nut 146 and by pulling on the finger grip 142, moving the position of the spring clip out or in to match the top rim of the pail or bucket (which may vary in diameter from one to another). The receptacles 60 are configured to permit at least some radial adjustment for the spring latches 140.

The wing nut 146 and washer 145 can also be used to assist in grounding an associated anti-static arrangement as explained later.

As shown in FIGS. 16, 17 and 18, an annular foam sealing gasket 160 is favorably installed within the channel member formed at the underside of the rim ring 30. A first ⅝ inch wide foam gasket member 161 is placed flat along the underside of the ring rim, with ends overlapping around the circumference, and firmly pressing against itself at the overlap to avoid air leaks. A second ¼ inch gasket member 162 is then installed along the inner lip of the rim ring and perpendicular to the ⅝ inch gasket member 161. This gasket member 162 should also overlap around the circumference to avoid any air leaks. This arrangement, properly installed, forms a secure, complete seal between the lid ring and the bucket so there are no air leaks.

Finally, as shown in FIG. 19, a conductive tape 170 is provided which can be installed so that it connects the inlet tube 26 and outlet tube 28 while wrapping at least partly around the shell 26 of the separator module, with at least about ¼ inch extending into each of the inlet and outlet tubes, wrapping around the edge of each opening. Favorably, a section of the tape 170 can also extend to one of the latch receptacles and fit over the associated pem stud. At that point a grounding wire can be attached, with a metallic member connected there and held in place by the wing nut and washer, and of sufficient length so that a washer affixed to its far end can lie on the workshop floor. Static-conductive elbows and couplers may be used at the inlet and outlet tubes to connect with the respective vacuum hoses, and these assist in static dissipation.

Although not shown here, there may be casters affixed on to the lower part of the pail or bucket 10, favorably four casters at 90-degree intervals, to assist in mobility of the bucket and associated lid-separator. One or another of the casters may be provided with a tether to attach to the shop vacuum, dust extractor, or other vacuum source. Alternatively, a four-caster dolly fitting the base of the bucket may be used.

The inventors have run a comparison test, employing an embodiment of this invention and also employing versions of the prior dust separation equipment to study their performance in a realistic setting. This made it possible to conduct a performance analysis as between (a) the low profile bucket lid and separator of this invention, (b) a conic cyclone dust separator arrangement "Dust Deputy" (see U.S. Pat. No. 7,202,074) mounted on a supporting bucket lid (See U.S. Pat. No. 11,419,467); and (c) an available cyclonic dust separator made according to Huntley U.S. Pat. No. 10,857, 550 (Dec. 8, 2020) ("Huntley") in which a low-profile separator with a concave top is fitted onto a dust collection bucket. In each case these were installed between the same source of process dust, and the same shop vacuum serving as a dust extractor or vacuum source. The results are displayed in the following table. In the case of the Huntley, the dust separator had to be taped around the fitting for the bucket to reduce the air leakage at the rim.

The results are tabulated as follows:

| Parameter | Dust Deputy | Huntley | This embodiment |
|---|---|---|---|
| Velocity (Ft/Min) | 4,868 | 3,319 | 4,675 |
| Flow (CFM) | 134.4 | 91.6 | 129.0 |
| Static Pressure (inches $H_2O$) | −2.663 | −1.303 | −2.90 |
| Maximum Static Pressure (blocked flow) (inches $H_2O$) | −43.9 | −41.2 | −42.8 |

These results of this performance comparison show a significantly better performance of the low profile dust collector embodying this invention as compared with the Huntley low profile separator, in terms of better airflow velocity and volume, with this low-profile dust collector achieving a better static pressure, when compared with the Huntley low-profile unit, and exhibiting performance that is comparable with the Dust Deputy tall conic dust separator. In the unit of this invention, the smaller diameter dust separator chamber, as compared with the Huntley unit, increases the air velocity, and the radial space between the circumferential slot and bucket rim, creates room for eddying in the bucket while reducing re-uptake of the collected dust. The decreased diameter of the dust separation chamber, and the addition of deflector vanes, i.e., the vane turret 48 around the center axis, helps achieve the increased performance. The venting of the top opening in the turret plug or insert 50 evens the pressure between the interior of the turret and the dust collection regions of the bucket, helping avoid re-uptake of dust. Also, as discussed earlier, the vertical tangential vanes improve separation by forcing the air to make a 180 degree turn, which causes an outward increase in momentum of the dust particles in the direction toward the dust slot. Also the vane ring 62 connects the vane turret to the outlet tube assisting in air flow out of the cyclonic chamber of the unit.

Finally the flexible and adjustable latches 40 on the lid ring assist in fitting the lid-separator onto a wider variety of buckets and pails. The one-piece latch design, favorably of Sanoprene TPE or similar material, is flexible and can be adjusted by the user inward and outward. This helps accommodate the various pails and buckets which may differ in diameter one to another by as much as two inches at the top rim.

The above and many other objects and features of this invention are achieved the aforedescribed embodiment, and in variations thereto, without departing from the scope and spirit of this invention, which is to be measured by the attached claims.

We claim:

1. A combination of a bucket lid for a portable dust collection bucket and a built-in low-profile cyclonic dust separator, comprising a lid ring having a center axis and having an outer edge adapted to conform with and fit onto an upper rim of said dust collector bucket, with an annular channel at said outer edge adapted to secure sealably but removably onto said upper rim; and having an inner generally circular inner circumferential edge concentric with said outer edge thereof;

a low profile cyclonic separator centered on said lid ring and rising from said inner edge thereof; the low profile cyclonic separator having a horizontal inlet tube adapted for accepting an inlet hose connecting to a source of said dust and air flow in which said dust is entrained; a vertical outlet tube at a center axis of said separator adapted for connecting to a vacuum source; a shell having a rounded wall that is affixed onto the lid ring at the inner edge thereof, and defining within it a cyclonic chamber creating an air flow direction from said inlet tube around the interior of the shell to a vertical outlet tube at the center axis; the shell having a shape that spirals from the outlet tube around said center axis in a downward direction; and a baffle assembly within said chamber disposed at the center axis and including a baffle plate having a central opening and an outer circumference positioned substantially at said inner circular edge and spaced therefrom over a major portion of the outer circumference thereof, to define an annular exit slot permitting separated dust to drop therethrough into the bucket; the slot having a gap that increases in the direction of air flow; and the baffle assembly further including a vane turret having a plurality of vertical slots admitting air flow from said cyclonic chamber, and a lower opening at the center opening of said baffle plate and an upper opening coupled to said vertical outlet tube; wherein said vane turret is formed of a circular array of vertical vanes rising from a center of said baffle plate to said outlet tube, the vanes defining said slots therebetween; and wherein said vane turret has a turret ring at an upper end thereof fitted to the outlet tube.

2. The combination bucket lid and low-profile cyclonic dust separator according to claim 1, wherein said lid ring is formed of an array of coffers, each coffer being an annular segment with a sloping surface, and each joined to a next thereof by a radially extending vertical step member.

3. The combination bucket lid and low-profile cyclonic dust separator according to claim 1, wherein said baffle center opening is located at a central portion of the baffle plate, and said vertical vanes rise from around said center opening.

4. The combination bucket lid and low-profile cyclonic dust separator according to claim 3 comprising a baffle dome insert fitting into said center opening, and having a pressure equalizing opening for equalizing the pressure between the interior of the vane turret and air within the dust collection bucket.

5. The combination bucket lid and low-profile cyclonic dust separator according to claim 3, wherein said shell is formed to have a rounded wall rising from said lid ring and a shape that spirals downwardly from said inlet tube and around said center axis to said outlet tube.

6. The combination bucket lid and low-profile dust separator according to claim 1, wherein said shell is formed of a transparent resin material.

7. The combination bucket lid and low-profile cyclonic dust separator according to claim 1, wherein the portable dust collection bucket is a five-gallon pail.

8. Combined bucket lid for a portable dust collection bucket and a built-in low-profile cyclonic dust separator, comprising a lid ring having a center axis and having an outer edge adapted for fitting said dust collection bucket, and an inner circular edge; a low-profile cyclonic separator centered on said lid ring, and rising from the inner edge of said lid ring; the cyclonic separator including an inlet tube adapted for accepting a hose that provides a flow of air with entrained dust; a shell having an outer wall affixed onto the lid ring, substantially at the inner edge thereof and incorporating said inlet tube, the shell defining within it a cyclonic chamber in which a cyclonic air flow is created for the flow of air received from said inlet tube, in an airflow direction spiraling from said inlet tube to a vertical outlet tube at said center axis; and a baffle assembly at a lower part of said cyclonic chamber and having a baffle plate disposed at said inner circular edge, and an open turret rising from a central opening of the baffle plate and having an open turret ring at its upper end fitting onto said outlet tube; wherein said open turret is formed of a circular array of vanes around said center axis, and rises from an the central opening in said baffle plate; and wherein said turret ring joins upper ends of the vanes of said turret to said outlet tube.

9. The combined lid and low-profile dust collector according to claim 8, wherein said lid ring has a plurality of sloping segments formed therein.

10. The combined lid and low-profile dust collector according to claim 9, further including radial step members connecting the end of each said sloping segment with and adjoining edge of a next segment.

11. The combined lid and low-profile dust collector according to claim 8 wherein said shell is formed as a rounded wall rising from said lid rim, and with a shape that spirals downwardly from said inlet tube and around said center axis to said outlet tube.

12. The combined lid and low-profile dust collector according to claim 8 wherein the vanes of said circular array each are separated from one another to define open spacings between them configured to face in the direction opposite to said air flow direction.

13. The combined lid and low-profile dust collector according to claim 8, wherein said baffle assembly further includes a baffle dome fitting into a lower end of said turret and having a center opening aligned with said center axis, and operative for equalizing air pressure between the interior of said turret and air within the dust collection bucket.

14. The combined bucket lid and dust collector according to claim 8, wherein said shell is formed of a transparent resin material.

15. The combined bucket lid and dust collector according to claim 8, wherein the portable dust collection bucket is a five-gallon pail.

* * * * *